(12) United States Patent
Doric (10) Patent No.: US 8,721,195 B2
(45) Date of Patent: May 13, 2014

(54) HIGH TRANSMISSION OPTOELECTONIC MECHANICAL ASSEMBLY

(71) Applicant: Optomak Inc., L'Ancienne-Lorette (CA)

(72) Inventor: Sead Doric, L'Ancienne-Lorette (CA)

(73) Assignee: Doric Lense Inc., Quebec (CA)

( * ) Notice: Subject to any disclaimer, the term of this patent is extended or adjusted under 35 U.S.C. 154(b) by 0 days.

(21) Appl. No.: 13/722,699

(22) Filed: Dec. 20, 2012

(65) Prior Publication Data

US 2013/0163939 A1 Jun. 27, 2013

Related U.S. Application Data (60) Provisional application No. 61/579,696, filed on Dec. 23, 2011, provisional application No. 61/678,822, filed on Aug. 2, 2012.

(51) Int. Cl.
*G02B 6/36* (2006.01)

(52) U.S. Cl.
USPC .................... 385/93; 385/53; 385/88; 385/92

(58) Field of Classification Search
CPC .............. G02B 6/32; G02B 6/42; G02B 6/36; G02B 6/4269; G02B 6/3604

USPC .......................................... 385/53, 88, 92, 93
See application file for complete search history.

(56) References Cited

U.S. PATENT DOCUMENTS

| | | | |
|---|---|---|---|
| 4,658,130 A | 4/1987 | Durbin | |
| 4,815,812 A | 3/1989 | Miller | |
| 5,039,193 A | 8/1991 | Snow et al. | |
| 5,450,509 A * | 9/1995 | Davis | 385/26 |
| 5,633,963 A | 5/1997 | Rickenbach et al. | |
| 8,369,662 B2 * | 2/2013 | Popp | 385/26 |
| 2012/0128297 A1 | 5/2012 | Popp | |

* cited by examiner

*Primary Examiner* — Jennifer Doan
(74) *Attorney, Agent, or Firm* — Fulbright & Jaworski LLP (57) ABSTRACT

The optoelectronic mechanical assembly can have an integrated light source and couple a non-rotary light outlet thereof directly into a tip of a freely rotatable optical fiber. The assembly includes a fixable structure which can house a light source, and a rotary structure which receives the optical fiber and which is mounted to the fixable structure by way of at least one bearing, in a manner to maintain the optical alignment of the optical fiber with the non-rotary outlet. If more than one light source is used, they can be combined into the common outlet by a beam combiner.

20 Claims, 6 Drawing Sheets

HIGH TRANSMISSION OPTOELECTONIC MECHANICAL ASSEMBLY

CROSS-REFERENCE TO RELATED APPLICATIONS

This application claims priority to U.S. provisional application 61/579,696, filed Dec. 23, 2011, and to U.S. provisional application 61/678,822, filed Aug. 2, 2012, both of which are hereby incorporated by reference.

FIELD

This specification relates to the field of optogenetics, and more specifically pertains to a rotary joint for coupling a non-rotary light outlet into a tip of a freely rotatable optical fiber.

BACKGROUND

Many optogenetic applications involve injecting light into a living organism. Many experiments are done on laboratory mice worldwide to develop this promising field of health sciences. In this context, the mouse has an implant on its head to inject the light into their brain cells, and typically keeps this implant until the end of its life. The implant has one end of a fiber-optic patch cord (or cable), the other end of which is connected to a light source.

As the mouse moves about in its cage, it can subject the fiber-optic patch cord to torsion which is both uncomfortable for the mice and can subject the fiber-optic patch cord to torsion, which is undesired. To this end, it was known in the art to use two patch cord sections connected to one another via a rotary joint, which allowed the mouse to move more freely in the cage. However, this led to two optical connections in the patch cord, a first one between the light source and the first section, and a second one across the rotary joint, which affected the beam quality in a way which was unsatisfactory for at least some optogenetic applications. Henceforth, there remained room for improvement.

SUMMARY

This specification describes a rotary joint which has a light source embedded therein, and by which an optic fiber patch cord can be directly, and rotatably coupled to the light source. The rotary joint with integrated light source allows achieving a very high image, or beam, quality and allows a very low resistance to rotation of the optic fiber patch cord, thereby making it particularly suitable to optogenetic applications on laboratory mice especially since the torsion resistance of the optical fiber implanted in the head of the mice is limited.

In accordance with one aspect, there is provided an optoelectronic mechanical assembly for coupling a non-rotary light outlet into a tip of a freely rotatable optical fiber, the optoelectronic mechanical assembly comprising: a rotary structure having a first annular engagement surface defined around a rotation axis, and having an optic fiber receptacle having an optic fiber tip position centered along the rotation axis; a fixable structure having the non-rotary light outlet having an optical axis coinciding with the rotation axis, at least one light source received on an associated heat sink, each of the at least one light source being held with the fixable structure in a direction to emit light from the non-rotary light outlet, a passage defined around the optical axis, and a second annular engagement surface concentric with the optical axis; at least one bearing engaged between the first annular engagement surface and the second annular engagement surface, thereby allowing said free rotation of the optical fiber while maintaining the alignment of the optical fiber tip position with the optical axis; a focusing lens positioned and oriented to receive light from the non-rotary light outlet, the focusing lens having a focus coinciding with the optical fiber tip position.

In accordance with another aspect, there is provided an optoelectronic mechanical assembly for coupling a non-rotary light outlet into a tip of a freely rotatable optical fiber, the optoelectronic mechanical assembly comprising: a rotary structure having a first annular engagement surface defined around a rotation axis, and having an optic fiber receptacle having an optic fiber tip position centered along the rotation axis; a housing structure having an optical beam combiner having a plurality of light inlets for corresponding beams of different wavelengths, the non-rotary light outlet, and dichroic surfaces which combines the different wavelength beams into a single beam exiting the non-rotary light outlet, the non-rotary light outlet having an optical axis coinciding with the rotation axis, a plurality of light sources each received on an associated heat sink and having an associated collimating lens, each of said light sources being held in a respective position and direction to emit a beam of light of a corresponding wavelength into a respective one of the plurality of light inlets, a passage defined around the optical axis, and a second annular engagement surface concentric with the optical axis; at least one bearing engaged between the first annular engagement surface and the second annular engagement surface, thereby allowing said free rotation of the optical fiber while maintaining the alignment of the optical fiber tip position with the optical axis; a focusing lens positioned and oriented to receive the single beam exiting the non-rotary light outlet, the focusing lens having a focus coinciding with the optical fiber tip, position.

In accordance with still another aspect, there is provided a fiber optic rotary joint having a fixable structure having a light source mounted to a heat sink; a rotary structure rotatably mounted to the fixable structure so as to rotate about an optical axis, and having an optical fiber connector having an optical fiber port coinciding with the optical axis; and a light passage extending between the light source and the optical fiber port to guide light emitted by the light source into an optical fiber held in the optical fiber port during use.

DESCRIPTION OF THE FIGURES

In the figures.

DETAILED DESCRIPTION

Figure 1:
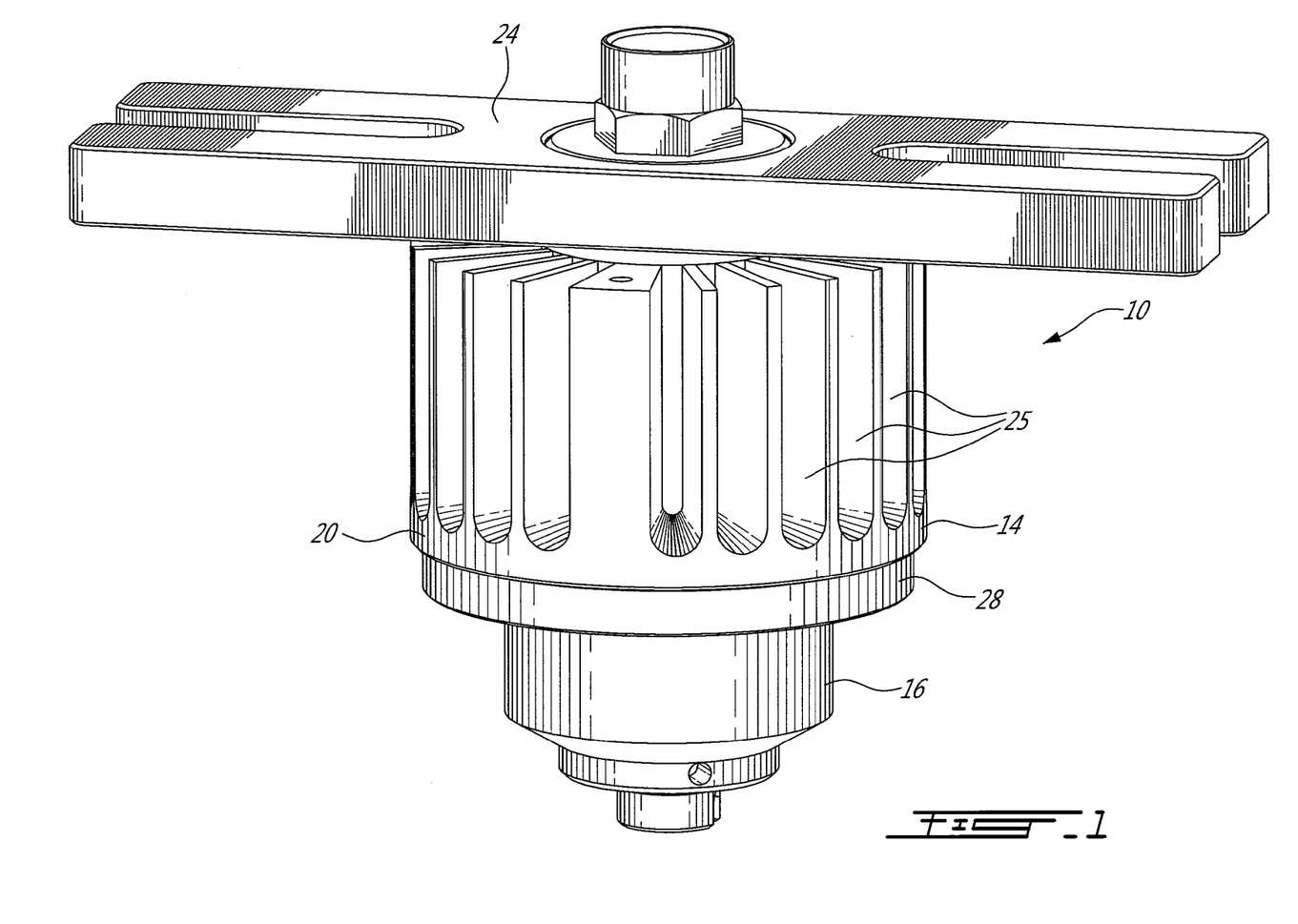
FIG. 1 is an oblique view of a first example of an optoelectronic mechanical assembly having an integrated light source.
Figure 2:
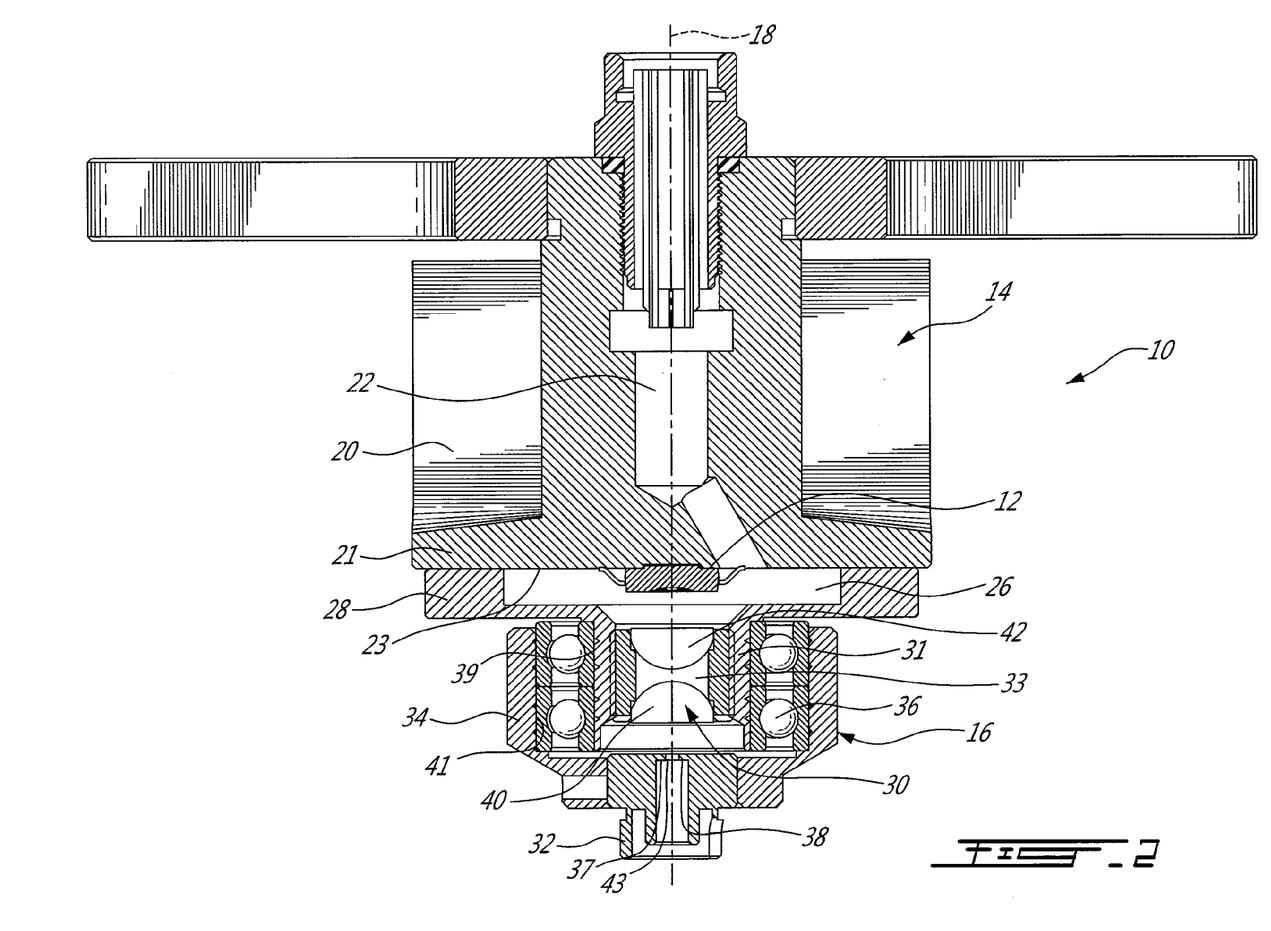
FIG. 2 is a cross-sectional view thereof.

FIGS. 1 and 2 generally show an example of an optoelectronic mechanical assembly 10 having an integrated light source 12. More specifically, the assembly 10 can be seen to generally have a fixable structure 14, and a rotary structure 16 rotatably mounted to the fixable structure 14 so as to rotate about an optical rotation axis 18.

The fixable structure 14 generally includes a light source 12, which can be a LED or laser diode arrangement for instance (multiple source arrangements are possible as well as presented below), which is mounted to a heat sink 20 in order to evacuate heat therefrom during operation. In this particular embodiment, the heat sink 20 is a passive heat sink that addresses potential overheating of the light source 12. Overheating of the light source 12 is typically undesired and has been known to reduce the optical power of LEDs and/or decrease the expected lifespan thereof. The heat sink has a hub 21 having a flat surface 23 receiving the light source 12 in good thermal contact therewith, and a wire passage 22 generally centered with, and traversing the hub 21, and through which electrical wires can be passed to power the light source 12. A plurality of fins 25 surround the hub 21 to assist in heat evacuation therefrom. In alternate embodiments, further heat management or control can be provided by way of a using a small ventilator, a thermo-electric cooler, or the like.

The heat sink 20 is removably held to a bracket 24, which can be used to fix the fiber optic rotary joint to a cage or the like (not shown) for optogenetic applications. The bracket 24 is optional. Further, the light source 12 is provided in an enclosed chamber 26 formed between an enclosure 28 and the heat sink 20, and in this manner, sensitive components such as electrical wires provided through the wire passage 22, the light source 12 and lens 30 are protected and shielded from the mouse. Alternately, loose electrical wire can be connected to the light source 12 without passing through the heat sink 20, when protecting sensitive equipment is not a concern. In this embodiment, the enclosure 28 has a male neck 31 protruding axially therefrom around the optical axis 18 and housing a lens arrangement 30, and a light passage 33 extending through the aperture and leading to the optical fiber. The male neck 31 has an annular surface provided in the form of a cylindrical outer surface 39.

The rotary structure 16 has an optical fiber receptacle 32 which protrudes axially from a female neck component 34, said female neck 34 having an annular surface in the form of a cylindrical inner surface 41 being rotatably mounted around the cylindrical outer surface 39 of the male neck 31 of the enclosure 28 by way of at least one bearing 36 which provide a very high freedom of rotation freedom to the rotary structure 16, and very little torsion resistance. More specifically, a pair of adjacent ball bearings is used in this embodiment to minimize play and variation of transmitted power, while requiring minimal torque to rotate. The assembly 10 is configured in a manner that the rotation axis of the rotary structure 16 coincides with the optical axis 18 with a satisfactory degree of precision. The precision with which the lens focus the beam onto the fiber tip is particularly important in achieving a good power transmission. If the focusing lens 40 is positioned in the fixable portion, the precision of the bearings 36 is key in achieving good power transmission and for instance, bearing play (backlash) of 10 or 20 microns can negatively affect power transmission when a transmission in the order of 80% is aimed. The optical fiber receptacle 32 can axially receive an optical fiber in a snug manner, and can have a stop 37 for the tip of the optical fiber to precisely be positioned at a predetermined optical fiber tip position 38 for a precise alignment with the rotary axis, and, in turn, with the optical axis 18, and to precisely coincide with a focus of the focusing lens 40. An aperture 43 continuing the light passage 33 and concentric with the optical axis 18 is provided to allow the focus to reach the optical fiber tip position 38. To achieve a good image quality, the optical fiber can have a flat tip surface oriented perpendicular to the optical axis with a high degree of precision, and precisely abut against the stop 37. For indicative purposes, using the teachings presented herein, optical transmission of over 80% has been achieved with LED light sources in the blue wavelength range. In the embodiments described herein, a connectorized laser diode source was preferred for orange light.

Now, in this specific configuration, the lens 30 have an imaging lens arrangement housed inside the hollow of the male neck 31 inside the light passage 33, across which the light emitted by the light source 12 travels to then reach the optical fiber tip held in the optical fiber port 38 when the assembly is in operation. In this embodiment, the imaging lenses include two lenses, a focusing lens 40 and a collimating lens 42 both of which are fixed, i.e. non-rotary, relative the fixable structure. More specifically, the imaging lens arrangement can be a high numerical aperture molded micro lenses of high quality that are precisely aligned to re-image the emitter of the high power LED onto the fiber tip with preferably a 1:1 magnification ratio. It will be noted that in alternate embodiments, the imaging lenses can both rotate with the rotary structure, or one can be non-rotary with the fixable structure and the other can be rotary with the rotary structure for instance.

More specifically, an alternate embodiment with the focusing lens being mounted to the rotary structure can be preferred because the position of its focus relative the optical fiber tip position is then not subjected to bearing backlash. In the latter case, if the collimating lens is provided in the fixable structure while the focusing lens is provided with the rotary structure, bearing backlash would affect the alignment between the focusing lens and the collimating lens, but this may be found to affect power transmission much less than affecting the alignment between the focusing lens and the optical fiber tip. Further, this can be preferred because it can allow to precisely align the focus of the collimating lens precisely with the brightest point on the LED light source while the focus of the focusing lens is precisely aligned with the optical fiber. If both the collimating lens and the focusing lens are provided in the rotary structure, bearing backlash would affect the alignment of the collimating lens relative the light source, which may also have less impact on power transmission than the positioning of the focusing lens focus on the optical fiber tip.

In optoelectrical mechanical assemblies such as taught herein, using a collimating lens with a sufficient numerical aperture can allow to obtain a better power transmission from a light source. A numerical aperture of above 0.22, preferably above 0.5 can be used. It will be noted here that if a laser emitter is used instead of a LED light source, the collimating lens may be omitted altogether. For the focusing lens, the numerical aperture can be selected to correspond to the numerical aperture of the tip of the optical fiber.

In certain embodiments, it can be advantageous to provide the light passage with means to "mix" the light to provide a more uniform beam in the optical fiber. One way to achieve this can include providing the light passage with a mixing light pipe, such as a hexagonal light pipe for instance, between the light source and the imaging lenses. To this end, the male neck can be made longer than in the illustrated embodiment and the light pipe can be received snugly therein, upstream of the lens arrangement. The use of means to mix the light can contribute to smoothen out irregularities which can occur upon rotation of the optical fiber in the event where the tolerances between the optical axis and the rotary axis exceed a predetermined threshold.

It will be noted that in alternate embodiments, the optoelectronic mechanical assembly can include more than one light source mounted with a single fixable structure, and all the light sources can be optically coupled into a single rotary optical fiber. For instance, using a larger heat sink base than the one illustrated, one can position a plurality of light sources against a planar surface of the larger heat sink base, and use a beam combiner, which can be housed within an enclosure for instance, to combine the beams of all the light sources along the optical axis and into the optical fiber. A suitable beam combiner can use a dichroic pentaprism such as the one described in U.S. Pat. No. 5,828,497 in the name of Raytheon Company, together with suitable mirrors, to combine three beams into the optical axis. Two beams, or more than three beams is also possible. In particular U.S. provisional application 61/678,822, entitled "Regular Pentagon-Arranged Optical Beam Splitting and Combining Assembly", incorporated herein by reference, describes various beam combiner configurations which can be incorporated into the fixed component with a variety of number of light sources.

In embodiments using a single light source, such as illustrated, the light source can have a light outlet directly aligned with the optical axis 18 with a relatively high degree of precision. In embodiments using multiple light sources, all the light sources can be said to be combined into a common light outlet which is aligned with the optical axis 18.

Combining the beams from more than one light source can be advantageous, for instance, in cases where it is desired to select different colors of illumination in the optical fiber with a single optical fiber connection. This can be achieved by using a three-color prism or a prism having a different number of colors, for instance, to the fixable structure and preferably to a common heat sink. 90° optical elbows can be used between the multiple-color prisms and the light sources, and between the multiple-color prism and the optical fiber. In the case where the intended heat sink size is limited, the light exiting the multiple-color prism can be recentered using a fresnel prism or the like, for instance, in which case the fresnel prism can be considered the light outlet.

Figure 3:
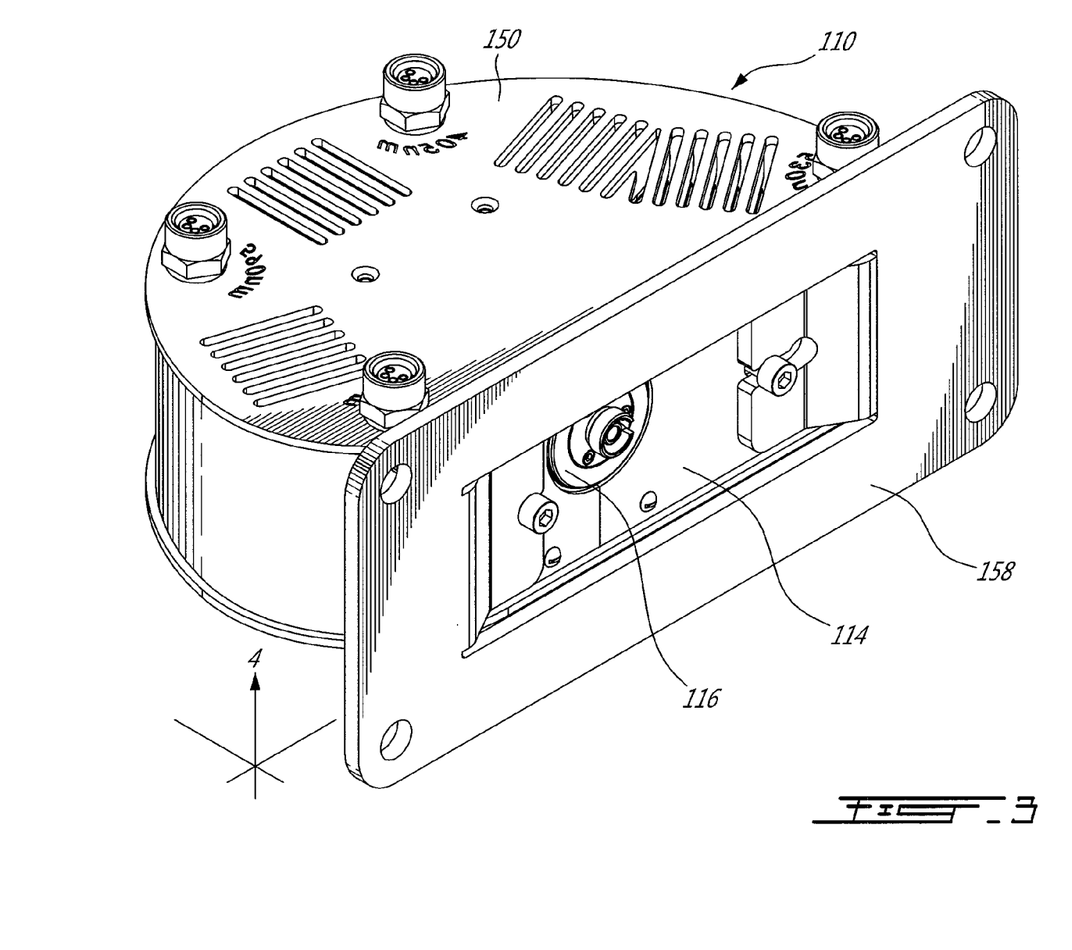
FIG. 3 is an oblique view of a second example of an optoelectronic mechanical assembly having an integrated light source.
Figure 4:
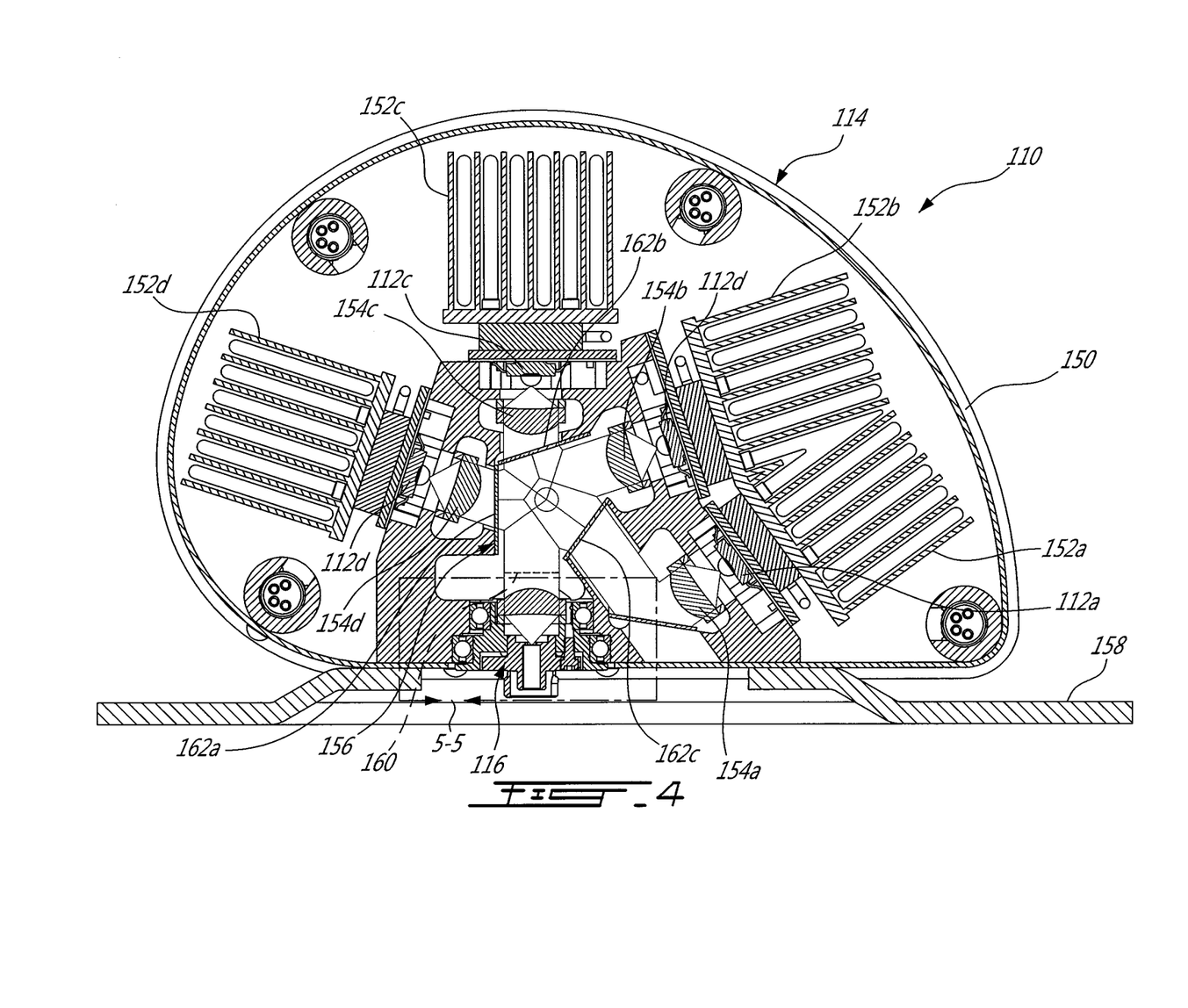
FIG. 4 is a cross-sectional view thereof, taken along cross section lines 4-4 of FIG. 3.
Figure 5:
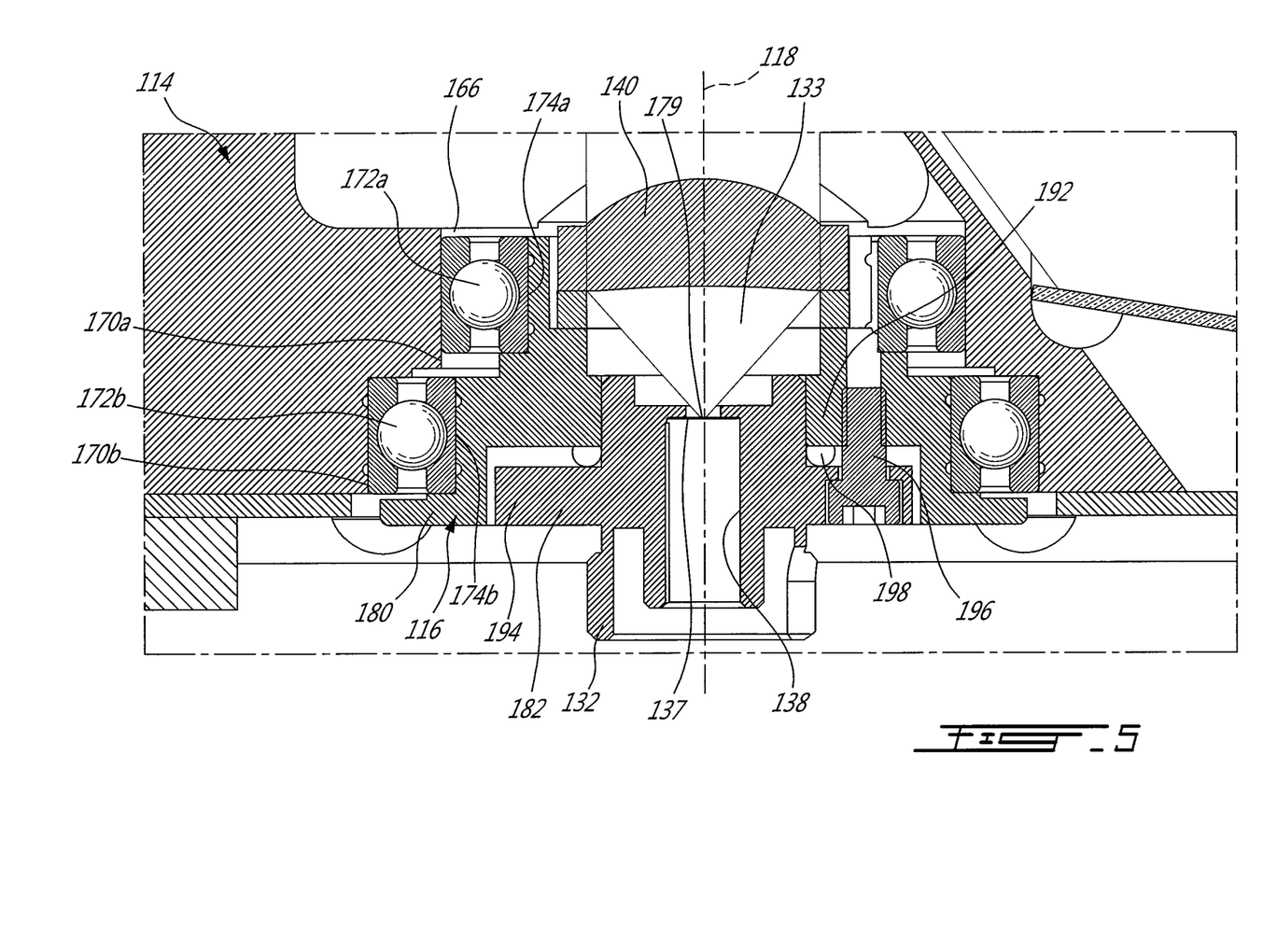
FIG. 5 correspond to portion 5-5 of FIG. 4, enlarged.

An example of an optoelectrical mechanical assembly 110 having 4 LED light sources 112a, 112b, 112c, 112d is shown in FIGS. 3 to 5. More specifically, this assembly also includes a rotary structure 116, and a fixable structure 114. In this embodiment, the fixable structure 114 includes a housing 150 which houses the light sources 112a, 112b, 112c, 112d together with their associated heat sinks 152a, 152b, 152c, 152d and collimating lens 154a, 154b, 154c, 154d, and an optical beam combiner 156 to combine the beams from each of the light sources 112a, 112b, 112c, 112d into a single non-rotary light outlet 160. In this embodiment, the housing 150 is assembled to a fixing plate 158 which can be fixed to a cage. In this embodiment, the light sources are LED sources each having an emission spectrally centered along a corresponding different wavelengths (i.e. LED sources of different colors). The optical beam combiner 156 includes a plurality of dichroic surfaces 162a, 162b, 162c which allow the transmission of the wavelength corresponding to the associated source while reflecting the wavelengths of the other sources, thereby combining the beams, in accordance with the teachings of provisional application 61/678,822.

The rotary structure 116 and its mechanism of assembly with the fixable structure 114 is shown more clearly on FIG. 5. More specifically, the fixable structure 114 has an aperture 166 defined therein and through which a light passage 133, and the optical axis 118 extend. The aperture 166 has two adjacent internal annular surfaces 170a, 170b, each receiving a corresponding ball bearing 172a, 172b. The rotary structure 116 is made of two portions between which alignment can be precisely adjusted: an optical fiber receptacle portion 182 having the optical fiber receptacle 132 and a hub portion 180 to which the focusing lens 140 is fixed, such as by adhesion for instance. The hub portion 180 has two adjacent external annular surfaces 174a, 174b which correspond to the two adjacent internal annular surfaces 172a, 172b of the aperture and receive an other side of the corresponding bearings. The annular surfaces are conical in this embodiment, but can alternately be truncated conical, or tapered. Two bearings are used to ensure a tight tolerances (minimal axial tilt or backlash) in the rotary joint and to maintain the alignment of the focusing lens with the non-rotary light outlet 160 (FIG. 4) and its associated optical axis 118. To this end, the rotation axis of the rotary structure 116 and the bearings and associated annular surfaces is made to coincide with the optical axis 118 as closely as possible. The fiber receptacle portion 182 has a male member 190 which penetrates a female member 192 of the hub portion 180, and a surrounding ledge 194 through which one or more (preferably 3) set screws 196 can extend to secure the fiber receptacle portion 182 to the hub portion 180 in an adjustable (alignable) manner. A resilient bushing 198 is used in this case, which can be an O'ring for instance, axially positioned between the ledge 194 and the hub portion 180. When compressed, the resilient bushing 198 imparts a resilient restoring force on the optic fiber receptacle portion 182 which can allow to achieve an even better alignment precision when adjusting the orientation of the fiber optic receptacle 138, and more specifically the optical fiber tip position 137 with the focus 179 of the focusing lens 140, in a manner to ensure a satisfactory amount of power transmission. In a specific embodiment, there are three equally circumferentially interspaced set screws 196 which allow to precisely align the optical fiber tip portion independently along two orthogonal axes coinciding with the plane of the ledge 194.

Figure 6:
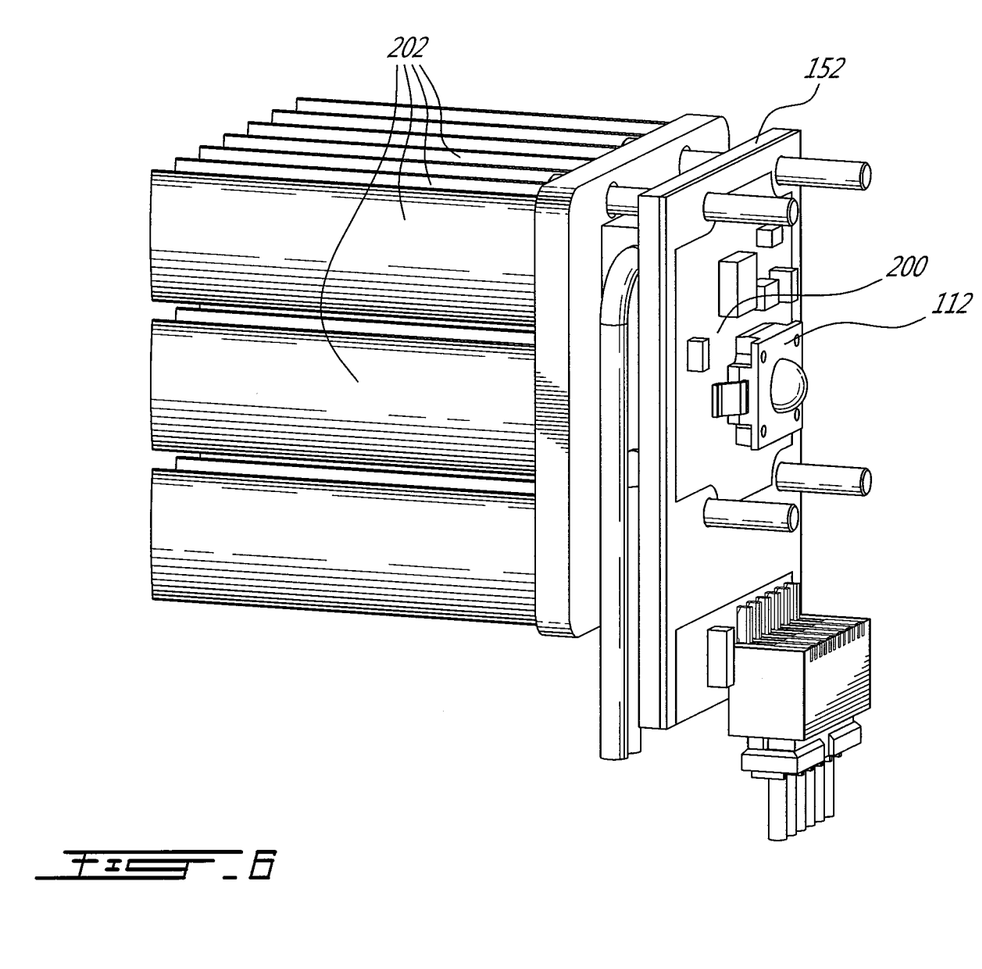
FIG. 6 shows an example of a light source which can be used in the optoelectronic mechanical assembly of FIG. 3.

FIG. 6 shows an example of a LED light source 112 with its associated heat sink 152. In particular, it can be seen that the LED light source has a good thermal contact with the surface 200 of the heat sink 152 which receives it, to which it can be assembled by glue for instance. The heat sink 152 preferably has a high thermal conductivity leading to the fins 202, and to this end, can be made of metal. A fan can be used to increase convection heat transfer at the fins 202. Thermo electric coolers can be glued to the heat sinks to reduce temperature.

Although not illustrated in this embodiment, and potentially less critical than precision alignment of the focusing lens with the optical fiber tip (at least when using a LED light source), means can also be provided to align the light source with the optical axis. More specifically, if a LED light source, or a connectorized laser diode is used, means can be provided to align the light source with its an associated collimating lens. If an unconnectorized laser diode is used, the collimating lens can be omitted, but precise alignment of the laser diode can be even more important. Means to align the light source can include set screws between two relatively movable structure portions as explained above in relation with the alignment features of the optic fiber receptacle portion 182 with a hub portion 180.

It will be understood that the expression non-rotary light outlet is used freely in this specification to refer to a portion of the light beam path independently of whether the light beam stems directly from a single light source, or is combined from multiple light sources. The expression non-rotary light outlet can correspond to an exit of the collimating lens 42 in the embodiment shown in FIG. 2, or to an exit of a beam combiner in the embodiment shown in FIG. 5, and does not necessarily refer to a portion of an optical component.

As can be seen therefore, the examples described above and illustrated are intended to be exemplary only. The scope is indicated by the appended claims.

What is claimed is:

1. An optoelectronic mechanical assembly for coupling a non-rotary light outlet into a tip of a freely rotatable optical fiber, the optoelectronic mechanical assembly comprising:
   a rotary structure having a first annular engagement surface defined around a rotation axis, and having an optic fiber receptacle having an optic fiber tip position centered along the rotation axis;
   a fixable structure having
      the non-rotary light outlet having an optical axis coinciding with the rotation axis,
      at least one light source received on an associated heat sink, each of the at least one light source being held with the fixable structure in a direction to emit light from the non-rotary light outlet,
      a light passage defined around the optical axis, and
      a second annular engagement surface concentric with the optical axis;
   at least one bearing engaged between the first annular engagement surface and the second annular engagement surface, thereby allowing said free rotation of the optical fiber while maintaining the alignment of the optical fiber tip position with the optical axis;
   a focusing lens positioned and oriented to receive light from the non-rotary light outlet, the focusing lens having a focus coinciding with the optical fiber tip position.

2. The assembly of claim 1, wherein the focusing lens is made integral, and rotates with, the rotary structure.

3. The assembly of claim 2, wherein the rotary structure includes a hub portion having the first annular engagement surface and receiving the focusing lens, and a receptacle portion having the optic fiber receptacle, a plurality of axially oriented set screws circumferentially interspaced around the rotary structure and extending through the receptacle portion and into the hub portion and adjustable to precisely align the optic fiber receptacle with a focus of the focusing lens, with a resilient bushing extending between the hub portion and the receptacle portion, the resilient bushing being compressible by the set screws.

4. The assembly of claim 1, further comprising: an optical beam combiner having a plurality of light inlets for corresponding beams of different wavelengths, the non-rotary light outlet, and dichroic surfaces which combines the different wavelength beams into a single beam exiting the non-rotary light outlet, the non-rotary light outlet having an optical axis coinciding with the rotation axis, wherein the at least one light source includes a plurality of light sources each being held in a respective position and direction to emit a beam of light of a corresponding wavelength into a respective one of the plurality of light inlets.

5. The assembly of claim 1, wherein the at least one light source includes a single light source having the non-rotary light outlet.

6. The assembly of claim 1, wherein each of the at least one light source has a LED light source, further comprising at least one collimating lens, each of said at least one collimating lens corresponding to a respective one of said at least one LED light source and being positioned and oriented to collimate light emitted from said respective light source for a collimated beam to be emitted from said non-rotary light outlet.

7. The assembly of claim 5, wherein the collimating lens have a numerical aperture above 0.22, preferably above 0.5.

8. The assembly of claim 1, wherein the fixable structure has an enclosure forming a closed chamber housing the at least one light source.

9. The assembly of claim 1, wherein the first annular engagement surface is provided in the form of a cylindrical internal surface of a female neck, and the second annular engagement surface is provided in the form of a cylindrical external surface of a hollow male neck having the passage therein and penetrating into the female neck.

10. The assembly of claim 9 wherein the focusing lens is housed inside the male neck.

11. The assembly of claim 1, wherein the second annular engagement surface is provided in the form a cylindrical inner surface of an aperture through which said passage extends, and the first annular engagement surface is provided in the form of a cylindrical outer surface of a male neck which extends into said aperture.

12. The assembly of claim 1, wherein said at least one bearing includes two adjacent bearings.

13. The assembly of claim 1, wherein the at least one associated heat sink is a metal heat sink having a hub surrounded by a plurality of fins and a light source surface against which the at least one associated light source is received in thermal contact.

14. The assembly of claim 13, wherein the at least one associated heat sink further comprises at least one of a fan driving an airflow to cool the plurality of fins and a thermo electric cooler.

15. The assembly of claim 13, wherein the heat sink has a passage defined therethrough and leading to the at least one associated light source, for connecting electrical wires thereto.

16. The assembly of claim 1, wherein the optical fiber has a flat inlet tip coinciding with the focus of the focusing lens.

17. An optoelectronic mechanical assembly for coupling a non-rotary light outlet into a tip of a freely rotatable optical fiber, the optoelectronic mechanical assembly comprising:
   a rotary structure having a first annular engagement surface defined around a rotation axis, and having an optic fiber receptacle having an optic fiber tip position centered along the rotation axis;
   a housing structure having
      an optical beam combiner having a plurality of light inlets for corresponding beams of different wavelengths, the non-rotary light outlet, and dichroic surfaces which combines the different wavelength beams into a single beam exiting the non-rotary light outlet, the non-rotary light outlet having an optical axis coinciding with the rotation axis,
      a plurality of light sources each received on an associated heat sink and having an associated collimating lens, each of said light sources being held in a respective position and direction to emit a beam of light of a corresponding wavelength into a respective one of the plurality of light inlets,
      a passage defined around the optical axis, and
      a second annular engagement surface concentric with the optical axis;
   at least one bearing engaged between the first annular engagement surface and the second annular engagement surface, thereby allowing said free rotation of the optical fiber while maintaining the alignment of the optical fiber tip position with the optical axis;
   a focusing lens positioned and oriented to receive the single beam exiting the non-rotary light outlet, the focusing lens having a focus coinciding with the optical fiber tip position.

18. The assembly of claim 17, wherein the focusing lens is made integral, and rotates with, the rotary structure.

19. The assembly of claim 17, wherein each of the at least one light source has a LED light source, further comprising at least one collimating lens, each of said at least one collimating lens corresponding to a respective one of said at least one LED light source and being positioned and oriented to collimate light emitted from said respective light source for a collimated beam to be emitted from said non-rotary light outlet.

20. A fiber optic rotary joint having a fixable structure having a light source mounted to a heat sink; a rotary structure rotatably mounted to the fixable structure so as to rotate about an optical axis, and having an optical fiber connector having an optical fiber port coinciding with the optical axis; and a light passage extending between the light source and the optical fiber port to guide light emitted by the light source into an optical fiber held in the optical fiber port during use.

* * * * *